United States Patent [19]

Worthington et al.

[11] 4,067,957

[45] Jan. 10, 1978

[54] PROCESS FOR PRODUCING HYDROGEN FLUORIDE FROM AN AQUEOUS HYDROFLUOROSILICIC ACID SOLUTION

[75] Inventors: Ralph Eric Worthington, Blackrock; Padraic Seamus O'Neill, Dublin, both of Ireland

[73] Assignee: Fitzwilton Limited, Dublin, Ireland

[21] Appl. No.: 703,519

[22] Filed: July 8, 1976

[30] Foreign Application Priority Data

July 18, 1975 Ireland .................................. 1611/75

[51] Int. Cl.$^2$ .............................................. C01B 7/22
[52] U.S. Cl. ...................................... 423/484; 423/185; 423/339; 423/341; 423/356; 423/312; 423/472; 423/490; 423/551
[58] Field of Search ............... 423/341, 356, 472, 483, 423/490, 185, 312, 339, 484, 551

[56] References Cited

U.S. PATENT DOCUMENTS

| | | | |
|---|---|---|---|
| 2,853,363 | 9/1958 | Sidun et al. | 423/341 |
| 3,195,979 | 7/1965 | Burkert et al. | 423/483 |
| 3,238,017 | 3/1966 | Yamaguchi et al. | 423/341 |
| 3,323,864 | 6/1967 | Lapple | 423/319 |
| 3,420,623 | 1/1969 | Barker | 423/341 |
| 3,793,436 | 2/1974 | Hartig | 423/341 |
| 3,966,877 | 6/1976 | Kalach et al. | 423/341 |

*Primary Examiner*—Jack Cooper

[57] ABSTRACT

Potassium fluoride and silica are reacted with an aqueous solution of hydrofluorosilicic acid. The resulting potassium fluorosilicate is recovered. The potassium fluorosilicate may be further reacted with ammonia in water to form an aqueous mixture of ammonium fluoride and potassium fluoride. The ammonium fluoride is then heated in aqueous solution in the presence of excess potassium fluoride to release ammonia and to form potassium bifluoride. The potassium bifluoride is recovered from solution substantially free from ammonia and heated to release hydrogen fluoride. Alternatively, the recovered potassium bifluoride may be reacted with sodium fluoride to produce sodium bifluoride. The sodium bifluoride is then heated to release hydrogen fluoride.

8 Claims, 2 Drawing Figures

PROCESS FOR PRODUCING HYDROGEN FLUORIDE FROM AN AQUEOUS HYDROFLUOROSILICIC ACID SOLUTION

This invention relates generally to the recovery of fluorine from an aqueous fluorine-containing liquid, and more particularly to the recovery of waste fluorine acids obtained as a by-product in the manufacture of phosphoric acid.

In current practice, particularly in the United States of America, by-product gypsum from wet process phosphoric acid production units is slurried with water and sent to a large pond in which the gypsum settles out. The supernatant water is cooled and recycled to the process for use in barometric condensers, gas scrubbing systems, gypsum slurrying and process water used in the product acid. The fluorine content of this water builds up to concentrations of from 1 to 2% depending on local plant conditions and remains steady at this level owing to recirculation of liquor, precipitation of insoluble fluorosilicates and vapour losses. However, discharge or seepage can lead to contamination by fluorine of surface water and ground water. The fluorine is present in the pond water substantially as hydrofluorosilicic acid $H_2SiF_6$. Phosphate and sulphate in relatively large concentrations, and calcium, iron, aluminium, sodium and potassium in much smaller concentrations, are also present.

It has been proposed to precipitate potassium fluorosilicate $K_2SiF_6$, which is substantially insoluble, by adding potassium chloride or potassium sulphate to aqueous fluorosilicic acid, as described in U.S. Pat. Nos. 2,556,064, 2,853,363, and 2,865,709.

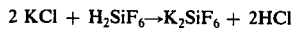

Although potassium chloride is a cheap and readily available source of potassium, it can be seen from the above equation that a dilute solution of hydrochloric acid is produced. This can give rise to disposal problems in commercial practice.

The recovery of the fluorine values of dilute fluorosilicate liquors for the ultimate production of hydrogen fluoride after producing 20% aqueous $H_2SiF_6$ has been proposed in U.S. Pat. Nos. 3,711,596, 3,720,757, 3,793,436 and 3,859,423. The method described in these publications involves precipitation of sodium fluorosilicate exclusively and demands a closed system involving a cooling tower. The restriction to sodium fluorosilicate arises from the need to calcine the precipitate to produce sodium fluoride for recycle and silicon tetrafluoride gas for absorption in water to give more concentrated $H_2SiF_6$. Sodium fluorosilicate decomposes at approximately 700° C. Potassium fluorosilicate requires a much higher temperature for decomposition. Since sodium fluorosilicate has a greater solubility than its potassium analogue, much less fluorine is recovered from the dilute liquors per unit throughput than in our proposed invention. The necessity for a closed system arises from the need to prevent pollution as a result of ammonia which is introduced to prevent precipitation of sodium phosphates.

An object of the present invention is a process whereby the fluorine content of cooling water and of gypsum ponds used in the production of phosphoric acid may be recovered as potassium fluorosilicate without any alteration to existing operations and without introducing any detrimental contaminant into the pond liquors. The process is, of course, also suitable for use in a closed system. The potassium fluorosilicate produced may be subjected to ammoniacal hydrolysis to give an aqueous mixture of potassium and ammonium fluorides which may be used by the process of the invention described in our U.S. pat. application Ser. No. 389,572 (filed Aug. 20, 1973) for the production of anhydrous hydrogen fluoride in an economic manner.

According to our invention, in its broadest aspect, we provide a process for recovering fluorine from an aqueous fluorine-containing liquid, which comprises reacting potassium fluoride and silica with an aqueous hydrofluorosilicic acid solution and recovering the resulting potassium fluorosilicate.

Adding potassium fluoride to hydrofluorosilicic acid results in the formation of a dilute HF solution:

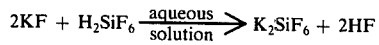

We react the HF produced with silica to produce more hydrofluorosilicic acid as follows:

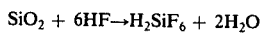

The hydrofluorosilicic acid then reacts with further potassium fluoride to precipitate potassium fluorosilicate. Thus, the equation for the overall process is as follows:

In these reactions, the silica acts as a base in producing, together with KF, a neutral salt from an acid.

Potassium fluorosilicate is a very insoluble salt and can be conveniently separated by precipitation. By this means, the only product from the fluorine recovery stage is $K_2SiF_6$. Any impurities originally in the dilute acid, e.g. phosphate, sulphate or calcium, are retained in solution in the liquors which may be discarded to the gypsum pond or returned to the phosphoric acid plant. The only source of impurities introduced into the following process for the production of anhydrous hydrogen fluoride is the liquors which are entrained in the precipitated $K_2SiF_6$. The liquors will, however, contain enough potassium to saturate the solution with $K_2SiF_6$, e.g. approximately 0.15 percent $K_2SiF_6$ at 20° C, corresponding to 5 percent of the fluorosilicate from a feed liquor containing 2 percent F.

If the liquors are returned to the gypsum pond, there is a loss of potassium by precipitation as potassium fluorosilicate. This loss increases with decreasing fluorosilicate content in the pond and is very significant with pond liquors of 0.5% F or under. In the case of more concentrated liquors, the small potassium loss may be further reduced by operating the precipitation step with an excess of fluorosilicic acid over potassium. A ratio of acid equivalents to potassium from 1:1 to 2:1, preferably from 1.3:1 to 1.7:1, and especially equivalents of 1.5:1 almost halves the potassium loss in the case of a liquor containing 2% F.

Alternatively, the liquors containing potassium may be stored and cooled separately from the gypsum pond in such a way that any precipitated potassium fluorosilicate can be recovered and the loss thereby avoided.

The potassium fluorosilicate recovered by the process of the invention may be converted by reaction with aqueous ammonia to a solution of KF and $NH_4F$. The resulting solution may be used for the manufacture of anhydrous hydrofluoric acid by a similar process to that described in our U.S. pat. application Ser. No. 389,572 (filed Aug. 20, 1973).

Thus, according to another aspect of our invention, we provide a process for recovering fluorine from an aqueous fluorine-containing liquid, which comprises reacting potassium fluoride and silica with an aqueous hydrofluorosilicic acid solution to form potassium fluorosilicate; reacting said potassium fluorosilicate with ammonia to form aqueous ammonium fluoride and potassium fluoride; heating said ammonium fluoride in solution in the presence of excess potassium fluoride to release ammonia and to form potassium bifluoride substantially free from ammonia; and decomposing said potassium bifluoride by heating to produce hydrogen fluoride.

In a preferred embodiment of this aspect of the invention, the potassium bifluoride is reacted with sodium fluoride to form sodium bifluoride, the sodium bifluoride is decomposed by heating to release the hydrogen fluoride and the sodium fluoride is preferably recycled to react again with potassium bifluoride.

The overall sequence of reactions in this embodiment is then as follows:

 (1)

$$K_2SiF_6 + 4NH_3 + 2H_2O \xrightarrow{H_2O} 4NH_4F + 2KF + SiO_2$$

 (2)

$$4NH_4F + 2KF + 2KF \xrightarrow[H_2O]{excess\ KF} 4NH_3 + 4KHF_2$$

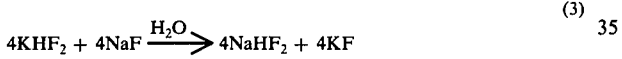 (3)

$$4KHF_2 + 4NaF \xrightarrow{H_2O} 4NaHF_2 + 4KF$$

 (4)

$$4NaHF_2 \xrightarrow{\Delta} 4NaF + 4HF$$

The process described in our U.S. patent application Ser. No. 389,572 (filed Aug. 20, 1973) starts from $H_2SiF_6$ rather than $K_2SiF_2$. There is then no net production of KF. However, if hydrogen fluoride were manufactured as shown in equations (1) to (4) above in isolation, some of the fluorine would be consumed in a net production of KF. The present invention avoids this difficulty since KF is required to react with the $H_2SiF_6$ in the initial stage. A net production of KF is avoided and an external source of potassium is not required, except for the addition of small quantities of potassium fluoride to make up for losses from the system.

The integrated system for the manufacture of anhydrous hydrofluoric acid from dilute aqueous fluorosilicic acid may be written as follows:

(a)

$$3KF + H_2SiF_6 + 0.5\ SiO_2 \longrightarrow 1.5\ K_2SiF_6 + H_2O$$

(b)

$$1.5\ K_2SiF_6 + 6NH_3 + 3H_2O \xrightarrow{H_2O} 6NH_4F + 3KF + 1.5\ SiO_2$$

(c)

$$6NH_4F + 3KF + 3KF \xrightarrow[H_2O]{excess\ KF} 6NH_3 + 6KHF_2$$

(d)

$$6KHF_2 + 6NaF \xrightarrow{H_2O} 6NaHF_2 + 6KF$$

(e)

$$6NaHF_2 \xrightarrow{\Delta} 6NaF + 6HF$$

In this system, one-third of the silica produced at (b) above is recycled to (a). One half of the potassium fluoride produced at (d) is recycled to (a) and the remainder to (c).

Further alterations to the system are desirable to allow for the presence of substantial quantities of potassium bifluoride in the recycled aqueous potassium fluoride stream from step (d). The aqueous KF solution as produced after filtration at 20° C is approximately 3 molar in KF and approximately 2 molar in $KHF_2$ i.e. containing about 170 g/l of KF and about 150 g/l of $KHF_2$. The $KHF_2$ which is recycled together with the KF to step (a) reacts as follows:

$$2KHF_2 + H_2SiF_6 \rightarrow K_2SiF_6 + 4HF$$

The HF produced reacts with silica as described above.

The general equation for the recovery of fluorine may now be written:

$$xKHF_2 + yKF + \left(\frac{x}{6} + \frac{y}{3}\right)H_2SiF_6 +$$

$$\left(\frac{x}{3} + \frac{y}{6}\right)SiO_2 \xrightarrow{H_2O}$$

$$\left(\frac{x+y}{2}\right)K_2SiF_6 + \left(\frac{2x+y}{3}\right)H_2O$$

Where $x = 2$ and $y = 3$ this becomes:

$$2KHF_2 + 3KF + 1.33\ H_2SiF_6 + 1.16\ SiO_2 \xrightarrow{H_2O}$$

$$2.5\ K_2SiF_6 + 3.5\ H_2O$$

The potassium fluorosilicate produced may be used according to the above reactions (b) to (e) for the production of hydrofluoric acid. The presence of excess silica in the raw material acid will not interfere with this scheme but merely reduces the quantity of silica recycled from step (b) to step (a).

The reaction of ammonium fluoride with potassium fluoride in aqueous solution is described in our U.S. patent application Ser. No. 389,572 (filed Aug. 20, 1973). It is preferred to remove water continuously from the system and the reaction is therefore generally carried out at the boiling point. The crystallised solids may be removed by cooling the hot reactor outflow to a suitable temperature, filtering and returning the filtrate to the reactor.

The weight ratio of fluoride ions to ammonium ions in solution in step (c) is generally greater than 2.5:1 and is preferably greater than 3:1. The upper limit of the level of fluoride ions in solution is governed by the solubility of the salts present.

In certain embodiments of the process involving the production of sodium bifluoride from potassium bifluoride and sodium fluoride, the potassium fluoride which is recovered and recycled is substantially contaminated by potassium bifluoride. As will be seen from the specific Examples below, this does not affect the efficiency of the process and in some cases can be advantageous as some of the water introduced at this stage need not now be evaporated since the dissolved salts will be recovered by precipitation as $K_2SiF_6$ when this stream is recycled to the precipitation stage.

Alkali metal bifluorides lose hydrofluoric acid on heating at elevated temperatures. Potassium bifluoride is quantitatively decomposed at temperatures in excess of 400° C. Sodium bifluoride is decomposed at temperatures in excess of 250° C. It is therefore a preferred embodiment of our process to convert the potassium bifluoride to sodium bifluoride by reaction with sodium fluoride, before decomposition to hydrogen fluoride. The sodium fluoride produced is recycled to the process. The exchange reaction may be carried out by slurrying a concentrated solution of potassium bifluoride with powdered sodium fluoride.

Phosphate and sulphate impurities entrained in the wet solid potassium fluorosilicate may be removed by washing the solid with water or may be carried forward with the unwashed solid, allowed to dissolve in the ammoniation liquor and hydrolysis liquor and allowed to build up to a certain level in the latter due to recycle. This system is kept steady by ammoniation to pH 10 of a diluted bleed stream of hydrolysis liquor, whereupon phosphate is precipitated as triammonium phosphate. By adjustment of concentrations to take advantage of the limited solubility of potassium sulphate in these liquors, the sulphate impurity can be likewise removed by precipitation.

Some improvements to the central hydrolysis step of the overall process are now described.

We have discovered that when the reaction is performed at pressures greater than atmospheric, an increase in the rate of production of bifluoride and of release of ammonia to the vapour phase is observed. In certain applications this can result in significant economies as the pressure needed to achieve the rise in boiling point of the liquors which is responsible for the enhanced rate is only of the order of a few atmospheres. In this embodiment the pressure is generally from 0 to 10 atmospheres (i.e. 0 to 150 PSIG), and preferably from 2 to 7 atmospheres.

Furthermore the liquor produced at the sodium exchange stage may be used to wash the potassium bifluoride cake prior to its reaction with sodium fluoride. We have discovered that this liquor, which consists of a mixture of potassium fluoride and bifluoride in equilibrium with the corresponding sodium salts, is not saturated with respect to potassium fluoride, the by-product of the reaction at this stage. The potassium bifluoride cake as produced in the hydrolysis reaction may contain from 85 to 99% of potassium bifluoride, depending on the concentration of fluoride, bifluoride, ammonium and potassium ions in the mother liquor. The balance is substantially potassium fluoride. Under conditions of high fluoride to ammonium ratio at which rapid rates of reaction are observed, the analysis of the cake tends toward the lower range of the bifluoride content indicated above. By contacting such a cake with the sodium exchange mother liquor, most of the impurity potassium fluoride is dissolved, thereby producing a purer potassium bifluoride solid and effecting economies in water usage at the sodium bifluoride production stage.

Reference is now made to the accompanying drawings.

Figure 1:
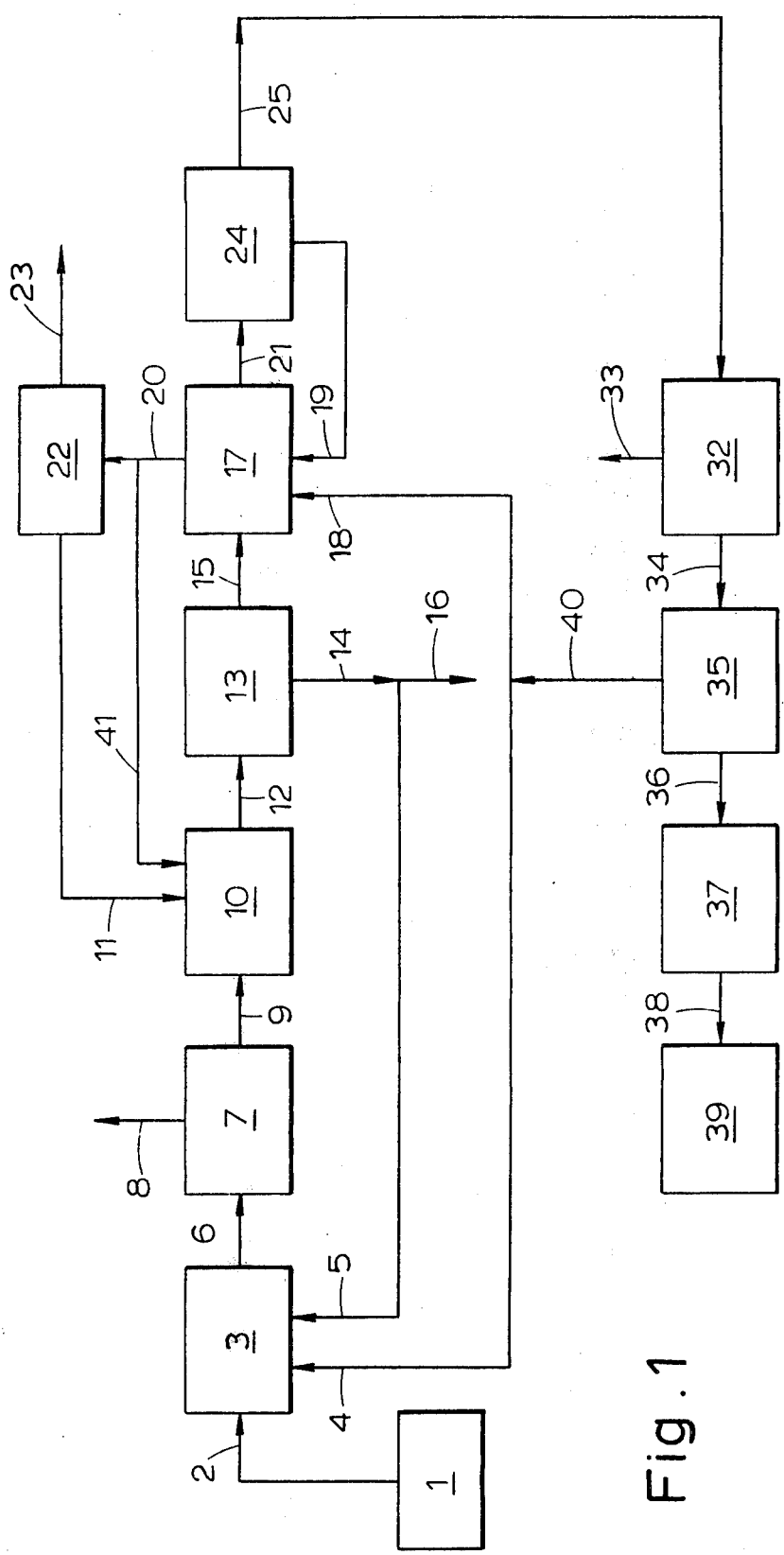
FIG. 1 is a flow sheet illustrating one embodiment of the invention.
Figure 2:
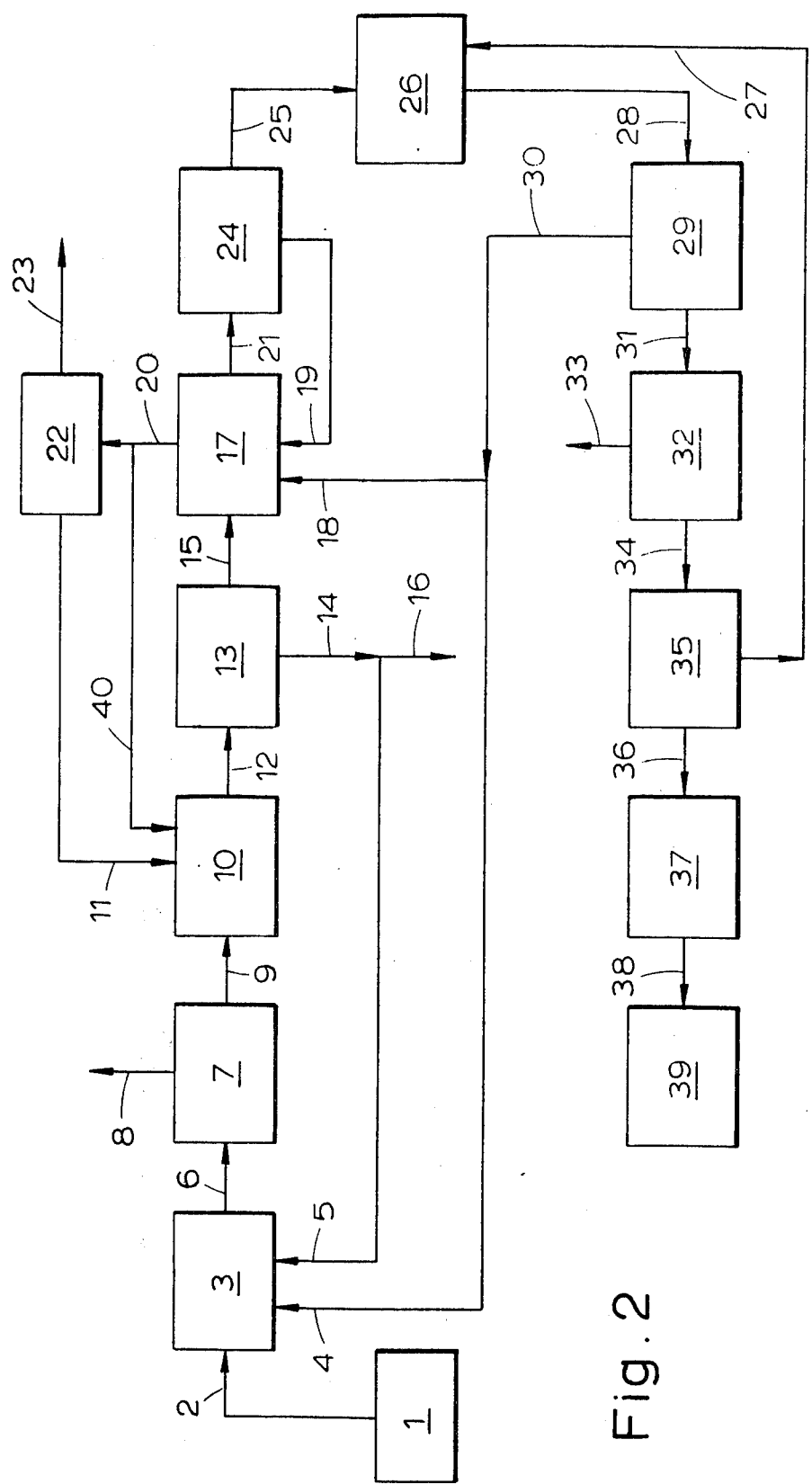
FIG. 2 is a flow sheet illustrating a preferred embodiment of the invention.

Fluorosilicic acid is fed from a source 1 via a conduit 2 to a precipitator reactor 3 where it reacts with recycled silica 5 and recycled potassium fluoride 4 to form a precipitate of potassium fluorosilicate. The potassium fluorosilicate slurry is fed via a conduit 6 to a separator 7 wherein the potassium fluorosilicate is separated from the mother liquor. The mother liquor is discarded at 8. The potassium fluorosilicate 9 thus recovered is fed to an ammoniator reactor 10 where it is reacted with recycled ammonia 11 to form ammonium fluoride, potassium fluoride and silica. The reaction slurry 12 is fed to a separator 13 where the silica is separated from the mother liquor. Part of the separated silica 14 is recycled via conduit 5 to the precipitator 3 as described below. The remainder is discarded at 16.

The mother liquor left after separating the silica contains ammonium fluoride and potassium fluoride in aqueous solution. This is fed through a conduit 15 to the hydrolysis reactor 17. Recycled potassium fluoride 18 is also fed to the reactor and filtrate 19 is recycled to the reactor from a separator 24. In the hydrolysis reactor 17, the ammonium fluoride and potassium fluoride react in aqueous solution to form potassium bifluoride and ammonia. The ammonia is recovered with vaporized water at 20, and part of it is separated in the stripper 22 to be recycled to the ammoniator 10. The remainder is recycled directly via conduit 41. The water 23 from the stripper is discarded.

The reactor contents containing potassium bifluoride are fed through a conduit 21 to the separator 24 where potassium bifluoride is separated substantially free from ammonia. The mother liquors 19 are recycled to the hydrolysis reactor 17.

The potassium bifluoride is fed via conduit 25 to a drier 32 where water is evolved at 33. The dry potassium bifluoride 34 is fed to a kiln 35 where it is heated to form potassium fluoride 40 and hydrogen fluoride 36. The potassium fluoride 40 is recycled, part 4 to the precipitator 3 and part 18 to the hydrolysis reactor 17.

The hydrogen fluoride 36 from the kiln is purified at 37 and stored at 39.

Fluorosilicic acid is fed from a source 1 via a conduit 2 to a precipitator reactor 3 where it reacts with recycled silica 5 and recycled potassium fluoride and potassium bifluoride in aqueous solution 4 to form potassium fluorosilicate. After passing through the conduit 6, the potassium fluorosilicate is separated from the mother liquor in a separator 7. The mother liquor is discarded at 8. The potassium fluorosilicate 9 thus recovered is fed to an ammoniator reactor 10 where it is reacted with recycled ammonia 11 to form ammonium fluoride, potassium fluoride and silica. The reaction slurry 12 is fed to a separator 13 where the silica is separated from the mother liquor. Part of the separated silica 14 is recycled 5 to the precipitator 3 as described above. The remainder is discarded at 16.

The mother liquor left after separating the silica contains ammonium fluoride and potassium fluoride in aqueous solution. This is fed through a conduit 15 to the hydrolysis reactor 17. Recycled potassium fluoride and potassium bifluoride in aqueous solution 18 are also fed to the reactor and filtrate 19 is recycled to the reactor from a separator 24. In the hydrolysis reactor 17, the ammonium fluoride and potassium fluoride react in aqueous solution to form potassium bifluoride and ammonia. The ammonia is recovered with vaporized water at 20, and part of it is separated in the stripper 22 to be recycled to the ammoniator 10. Part of the aqueous ammonia may be recycled directly to the ammoniator via conduit 40.

The reactor contents containing potassium bifluoride are fed through a conduit 21 to the separator 24 where potassium bifluoride is separated. The mother liquor 19 is recycled to the hydrolysis reactor 17.

The potassium bifluoride 25 is fed to a sodium exchange reactor 26 where it reacts with recycled sodium fluoride 27 and water, optionally recycled from the stripper, to form sodium bifluoride and potassium fluoride. The reaction slurry 28 is fed to a separator 29 where the solid sodium bifluoride is separated from the mother liquors. The mother liquors 30 contain potassium fluoride and potassium bifluoride in aqueous solution and are recycled, partly 4 to the precipitator 3 and partly 18 to the hydrolysis reactor 17.

The solid sodium bifluoride from the separator 29 is fed via conduit 31 to a drier 32 where water 33 is evolved. The dry sodium bifluoride 34 is fed to a kiln 35 where it is heated to form sodium fluoride 27, which is recycled to the sodium exchange reactor 26, and hydrogen fluoride 36. The hydrogen fluoride is purified at 37 and stored at 39.

The invention is further illustrated by the following Examples.

EXAMPLE 1

33.94 liters per hour of an aqueous solution of fluorosilicic acid were fed to a continuous stirred tank reactor of volume 7.5 liters. The concentration of the fluorosilicic acid was 2% by weight. 2.94 liters per hour of an aqueous solution of potassium fluoride and potassium bifluoride were also fed to the reactor. The concentration of potassium fluoride was 2.9 gram moles per liter and the concentration of potassium bifluoride was 2.0 gram moles per liter. Dry silica (produced by reacting ammonia with fluorosilicic acid) was fed to the reactor at a rate of 222.4 grams per hour. Thus, there was a 10% excess of silica over the stoichiometric amount required to react with the potassium fluoride and potassium bifluoride.

The reactor was maintained at a temperature of about 20° C and the overflow was collected at the rate of 36.3 liters per hour and filtered.

35.4 liters per hour of filtrate were obtained, and contained 0.087% potassium fluorosilicate, and 0.36% of fluorosilicic acid.

2262 grams/hour of solid were obtained. The moisture content was 30% and the dried solid contained 97.2% of potassium fluorosilicate.

EXAMPLE 2

29.4g of dry, reagent grade potassium fluosilicate were mixed with 190g of aqueous ammonia solution containing 9.6% by weight of ammonia. The mixture was boiled under reflux for 6 hours in a glass vessel equipped with a water-cooled condenser. There was a small loss of ammonia which was present in 100% excess at the start.

The mixture was cooled to 48° C and filtered, giving 166g of filtrate containing 9.84g of fluoride as a mixture of ammonium and potassium salts, and 38.4g of unwashed solid. The solid was washed by displacement with 100g of water at 50° C, resulting in 34.0 g of wet, washed solid and 101g of washings. The former was dried to a dry solid weight of 14.0g and the washings contained 1.75g of fluoride. This represents a 76% overall conversion of fluosilicate to soluble fluoride and insoluble silica.

EXAMPLE 3

1. 33.1g of potassium fluoride, 29.7g of potassium bifluoride in 190 ml of aqueous solution and 14.5g of dry silica were reacted for 15 minutes at 20° C with 2.16 kg of an aqueous solution containing 54.6g of fluorosilicic acid. The reaction mixture was filtered and a solid containing, after drying, 99.6g of $K_2SiF_6$ and 1.25g of silica was obtained.

2. This solid was reacted with 42.0g of ammonia dissolved in 600 ml of aqueous solution in a closed flask held in a heated bath at 50° C. The contents of the flask were vigorously stirred thus for 10 hours. The slurry was then filtered at 50° C, giving 499 ml of filtrate containing 43.6g of dissolved fluoride and a wet solid which was then washed with 200 g of water to give 204 ml of washings which contained 7.2g of dissolved fluoride. The wet washed solid weighed 104.2g and after drying weighed 27.8g.

3. The combined filtrate and washings from (2), consisting of 700 ml of solution containing 65.9g of ammonium fluoride, 51.7g of potassium fluoride and 11.2g of ammonia, were fed to a reactor of capacity 590 ml over a period of 1 hour. Also during this period, 470 ml of recycled filtrate containing 53.9g of ammonium fluoride, 171g of potassium fluoride and 40.6g of potassium bifluoride, and 430 mls. of filtrate from the subsequent sodium exchange stage (4) below containing 74.9 g of potassium fluoride and 67.2g of potassium fluoride were fed to the reactor. The reactor was heated so that the liquor within it was boiling constantly. A gaseous mixture was evolved during the hour, consisting of 41.5g of ammonia mixed with 1000g of steam. The liquid phase was a concentrated boiling solution with a steady state composition of 2.4 moles of ammonium fluoride per liter, 5.8 moles of potassium fluoride per liter and 5.4 moles of potassium bifluoride per liter. This liquor overflowed at a rate of 590 ml. per hour into another vessel where it was cooled to 40° C, whereupon a well-formed crystalline solid was obtained and filtered off. After drying, the solid consisted of 205g of potassium bifluoride, 27.3g of potassium fluoride and minor quantities (less than 1%) of ammonium bifluoride. The filtrate was recycled to the reactor for further processing.

4. The solid was stirred vigorously with a solid consisting of 70g of sodium fluoride, 8.2g of potassium bifluoride and 6.8g of potassium fluoride and 602g of water for 30 mins. at 20° C. The slurry was filtered and the solid was thoroughly drained, producing 148g of wet solid consisting of 85.6g of sodium bifluoride, 12.0g of sodium fluoride, 8.2g of potassium bifluoride, 6.8g of potassium fluoride and 35g. of water. The filtrate of volume 620 mls. contained 96.8g of potassium bifluoride and 108g of potassium fluoride and was recycled partly to stage (1) and partly to stage (3).

5. The solid was dried at 100° C. When the moisture content was less than 0.5%, the solid was kilned at 320° C to produce 27.6g of hydrogen fluoride gas and a sodium fluoride solid which was recycled to stage (4).

EXAMPLE 4

Product obtained as in stage (3) of Example 3 consists substantially of 88% by weight of potassium bifluoride and 12% of potassium fluoride. By washing this solid with filtrate as produced in stage (4) of Example 3 it is possible to remove most of the potassium fluoride and thereby upgrade the solid.

107g of solid containing 94g of potassium bifluoride and 13g of potassium fluoride were washed with 250 ml of liquor as described containing 39g of potassium bifluoride and 44g of potassium fluoride. After stirring the slurry for 10 mins. and filtering at 20° C, a solid was obtained which, after drying, consisted of 95g of potassium bifluoride and 5g of potassium fluoride. 250 ml of wash liquor were obtained, containing 38g of potassium bifluoride and 52g of potassium fluoride.

This solid, now containing 95% of potassium bifluoride, was slurried in 238g of water with 37g of sodium fluoride at 20° C and stirred for 30 minutes. After filtering at 20° C, a wet solid containing 26% of moisture was obtained, together with 288g of liquor in which 37g of potassium bifluoride and 41g of potassium fluoride were dissolved. After drying, the solid weighed 64.2g and consisted of 72% of sodium bifluoride and 7.9% of potassium as a mixture of bifluoride and fluoride salts, the balance being sodium fluoride. Approximately 60% of the potassium bifluoride introduced into the reactor had been converted to sodium bifluoride.

We claim:

1. A process for producing hydrogen fluoride from an aqueous hydrofluorosilicic solution which comprises
   i. reacting potassium fluoride and silica with said aqueous hydrofluorosilicic acid solution according to the equation:

$$3KF + H_2SiF_6 + 0.5SiO_2 \rightarrow 1.5K_2SiF_6 + H_2O$$

to form potassium fluorosilicate;
   ii. reacting said potassium fluorosilicate with ammonia in water according to the equation:

$$1.5K_2SiF_6 + 6NH_3 + 3H_2O \xrightarrow{H_2O} 6NH_4F + 3KF + 1.5SiO_2$$

to form an aqueous mixture of ammonium fluoride, potassium fluoride; and silica
   iii. heating said ammonium fluoride in aqueous solution in the presence of potassium fluoride according to the equation:

$$6NH_4F + 6KF \xrightarrow[H_2O]{excess\ KF} 6NH_3 + 6KHF_2$$

to release ammonia and to form potassium bifluoride;
   iv. recovering said potassium bifluoride as a solid from solution and
   v. heating said potassium bifluoride to release hydrogen fluoride and form potassium fluoride.

2. A process as claimed in claim 1, wherein potassium fluoride produced in stage (v) is recycled partly to stage (i) and partly to stage (iii); wherein ammonia is recycled from stage (iii) to stage (ii); and wherein a substantial portion of the silica produced in stage (ii) is recycled to stage (i).

3. A process as claimed in claim 1, wherein phosphate and sulphate impurities introduced with the aqueous hydrofluorosilicic acid solution are removed by precipitation as triammonium phosphate and potassium sulphate from a bleed of potassium bifluoride mother liquor after adjustment of the pH of the bleed by ammoniation.

4. A process as claimed in claim 1, wherein the reaction of ammonium fluoride and potassium fluoride in aqueous solution in stage (iii) is effected under a small positive pressure of from 0 to 10 atmospheres.

5. A process as claimed in claim 1, wherein the mother liquor from the potassium bifluoride recovery stage (iv) is recycled to stage (iii).

6. A process for producing hydrogen fluoride from an aqueous hydrofluorosilicic which comprises:
   i. reacting potassium fluoride and silica with said aqueous hydrofluorosilicic acid solution according to the equation:

$$3KF + H_2SiF_6 + 0.5SiO_2 \rightarrow 1.5K_2SiF_6 + H_2O$$

to form potassium fluorosilicate; (ii) reacting said potassium fluorosilicate with ammonia in water according to the equation:

$$1.5K_2SiF_6 + 6NH_3 + 3H_2O \xrightarrow{H_2O} 6NH_4F + 3KF + 1.5SiO_2$$

to form an aqueous mixture of ammonium fluoride, potassium fluoride; and silica
   iii. heating said ammonium fluoride in aqueous solution in the presence of potassium fluoride according to the equation:

$$6NH_4F + 6KF \xrightarrow[H_2O]{excess\ KF} 6NH_3 + 6KHF_2$$

to release ammonia and to form potassium bifluoride;
   iv. recovering said potassium bifluoride as a solid from solution;
   v. reacting said potassium bifluoride with sodium fluoride according to the equation:

$$6KHF_2 + 6NaF \xrightarrow{H_2O} 6NaHF_2 + 6KF,$$

bifluoride and any aqueous potassium fluoride solution; and
   vi. heating said sodium bifluoride to release hydrogen fluoride and form sodium fluoride.

7. A process as claimed in claim 6, wherein the potassium fluoride solution containing some potassium bifluoride obtained in stage (v) is recycled partly to stage (i) and partly to stage (iii); wherein sodium fluoride is recycled from stage (vi) to stage (v); wherein ammonia is recycled from stage (iii) to stage (ii); and wherein a substantial portion of the silica produced in stage (ii) is recycled to stage (i).

8. A process as claimed in claim 6, wherein the potassium bifluoride solid is washed with liquor obtained in the production of the sodium bifluoride in order to upgrade said potassium bifluoride prior to its reaction with sodium fluoride to produce said sodium bifluoride.

* * * * *